US005603788A

United States Patent [19]
Abe et al.

[11] Patent Number: 5,603,788
[45] Date of Patent: Feb. 18, 1997

[54] METHOD OF MANUFACTURING A CERAMICS-TYPE VACUUM VESSEL

[75] Inventors: Tetsuya Abe; Yoshio Murakami, both of Ibaraki-ken; Hisao Takeuchi, Hyogo; Akira Yamakawa, Hyogo; Masaya Miyake, Hyogo, all of Japan

[73] Assignees: Sumitomo Electric Industries, Ltd., Osaka; Japan Atomic Energy Institute, Tokyo, both of Japan

[21] Appl. No.: 457,013

[22] Filed: Jun. 1, 1995

Related U.S. Application Data

[62] Division of Ser. No. 937,981, Aug. 28, 1992, abandoned.

[30] Foreign Application Priority Data

Aug. 28, 1991 [JP] Japan .................................... 3-242551

[51] Int. Cl.[6] ............................ B32B 31/12; B32B 31/26

[52] U.S. Cl. ................................ 156/89; 264/56; 264/65; 264/66

[58] Field of Search ............................ 156/89; 428/34.4; 141/65; 264/56, 60, 65, 66; 313/62, 317

[56] References Cited

U.S. PATENT DOCUMENTS

| | | | |
|---|---|---|---|
| 4,662,958 | 5/1987 | Conder et al. | 156/89 |
| 4,712,074 | 12/1987 | Harvey . | |
| 4,761,134 | 8/1988 | Foster . | |
| 4,780,161 | 10/1988 | Mizuhara | 156/89 |
| 4,783,041 | 11/1988 | Sakaida et al. . | |

FOREIGN PATENT DOCUMENTS

| | | |
|---|---|---|
| 0117136 | 8/1984 | European Pat. Off. . |
| 0334000 | 9/1989 | European Pat. Off. . |
| 0415398 | 3/1991 | European Pat. Off. . |
| 2595876 | 9/1987 | France . |
| 61-110761 | 5/1986 | Japan . |
| 63-173307 | 7/1988 | Japan . |

OTHER PUBLICATIONS

Japanese Industrial Standard B0021 (1984).

I.E.E.E. Transactions on nuclear science "The titanium vacuum chamber for the zero gradient synchrotron" by W. B. Hanson, pp. 945–949, Jun. 1969.

Kerntechnik, "Teilchenbeschleuniger–Vakuumkammern aus Aluminium–oxidkeramik" by H. Droschka, Nov. 1970, pp. 477–479.

Journal of Nuclear Materials "Fabrication of the 320–CM–OD all Ceramic ZT–40 Torus" by W. E. Hauth et al., pp. 433–437, vol. 85&86, 1979.

Keramik Teil 1: Allgemeine Grundlagen und wichtige Eigenschaften by H. Salmang et al. pp. 1, 2, 187, 195 (1982).

*Primary Examiner*—David A. Simmons
*Assistant Examiner*—M. Curtis Mayes
*Attorney, Agent, or Firm*—W. G. Fasse; W. F. Fasse

[57] ABSTRACT

A vacuum vessel is provided in which the majority of a vessel wall including an annular wall portion (1) and a plate-wall portion (2) is formed of ceramic material such as silicon nitride, for example. To bond the plural wall members together, bonding faces having a surface flatness of not more than 1 μm are prepared thereon, and then a ceramic powder bonding substance with an average particle diameter of not more than 1 μm is interposed between adjacent bonding faces and subjected to heating. Because the generation of gas, such as hydrogen, from the wall of the ceramic vessel is reduced, extremely high vacuum can be generated and maintained in the interior of the vacuum vessel. Also, because the wall of the vacuum vessel has a high permeability with respect to a magnetic field and an electric field, the vacuum vessel can be used as a vessel in a particle accelerator that allows the high precision control of charged particles therein by means of an electromagnetic field.

20 Claims, 1 Drawing Sheet

METHOD OF MANUFACTURING A CERAMICS-TYPE VACUUM VESSEL

CROSS-REFERENCE TO RELATED APPLICATION

This is a Divisional of U.S. patent application Ser. No. 07/937,981, filed Aug. 28, 1992 (now abandoned).

BACKGROUND OF THE INVENTION

1. Field of the Invention

The present invention relates to a vacuum vessel suitable for obtaining an ultrahigh vacuum or an extremely high vacuum needed in semiconductor manufacturing apparatus and in particle accelerators, and a method for manufacturing thereof.

2. Description of the Related Art

In manufacturing a semiconductor device having a very high integration density, even a minute defect at the time of a thin film formation process will result in definite damage in the performance of the device. Therefore, the need arises for an extremely high vacuum, which is higher than an ultrahigh vacuum, in a thin film deposition apparatus for the purpose of preventing contamination in the grating lattice due to foreign elements as well as the introduction of minute dust particles which may cause defects in the semiconductor device.

Realization of an extremely high vacuum is indispensable not only in the semiconductor field but also in the field of particle accelerators used in nuclear fusion reactors for the purpose of maintaining a long lifetime of accelerated particles. Research for achieving extremely high vacuum is under study in various fields.

In order to produce ultrahigh vacuum or extremely high vacuum, an evacuating system that can achieve a lower pressure and that has a large exhaust capacity is required. Suppressing the generation of gas or off-gassing from the inner wall of a vacuum vessel and prevention of leakage from the joints of the vacuum vessel are particularly important factors for attaining and maintaining ultrahigh vacuum or extremely high vacuum.

The wall of a conventional vacuum vessel is formed of stainless steel or aluminum alloy. A vacuum vessel formed mainly of such materials exhibits a great amount of gas generation or off-gassing from the metal surfaces and also from the inside of the metal walls during evacuation. The main component of the generated gas is water vapor at relatively low vacuum levels where baking is not carried out, and is hydrogen when baking is carried out and water removed. Although the amount of gas generation can be reduced by raising the baking temperature, the baking temperature of a metal vessel is limited to approximately 300° C. It was therefore considered impossible to completely suppress gas generation by baking.

Various methods for suppressing gas generation other than by baking have been considered, such as using stainless steel of low hydrogen occlusion manufactured by dissolving a metal material of low impurities under vacuum, processing the inner wall of an aluminum alloy by discharging in a gas mixture of argon and oxygen to form an oxide film on the aluminum alloy, or a combination of these methods and also applying a mirror-finish to the inner wall formed of stainless steel or aluminum alloy. The gas generation can be reduced considerably by combining these methods and baking. It has been reported that an extremely high vacuum on the order of $10^{-13}$ Torr was obtained with a vacuum vessel made of stainless steel or aluminum alloy. However, generation of hydrogen gas was exhibited from the wall of such vessels, so that the vacuum that could eventually be obtained was limited by the hydrogen gas. The development of a vacuum vessel with extremely low gas generation is desired.

In the field of a particle accelerator, an electric field or a magnetic field is applied in the vacuum vessel for controlling the motion of the charged particles. In the present state of the art where the coil for generating an electromagnetic field is provided outside of the vacuum vessel, a vacuum vessel formed of either stainless steel or aluminum alloy, which have the effect of shielding the magnetic field and the electric field, has the problem of disabling the high precision control of the accelerated particles. It has been impossible to form a vacuum vessel accommodating a coil to solve this problem because of limitations associated with materials and shapes of the vessel.

An approach using a vacuum vessel made of glass that has a low hydrogen occlusion and that easily passes electric field and magnetic field for the precise control of accelerated particles could be considered. However, the vessel will have a low reliability due to the forces exerted on the wall of the vessel during evacuation, because the strength of glass is low and it is easily broken. Furthermore, glass begins to soften during baking, or the glass may crack due to thermal stress caused by any nonuniformity of the baking temperature. Therefore, glass is not practical to be used to make a vacuum vessel.

SUMMARY OF THE INVENTION

An object of the present invention is to provide a vacuum vessel having a reduced off-gassing or generation of gas such as hydrogen, which would cause a rise in pressure, i.e. a decrease of vacuum.

Another object of the present invention is to provide a vacuum vessel for a particle accelerator having sufficient mechanical strength and allowing the control of the acceleration of charged particles at high precision.

A further object of the present invention is to provide a method of manufacturing a vacuum vessel applicable to manufacturing apparatus of a semiconductor device and particle accelerators.

According to the present invention, a vacuum vessel is provided for maintaining a vacuum space in the interior of the vessel, wherein most of the surface bounding the space for holding the vacuum consists of ceramics other than aluminum oxide.

In the present invention, most of the surface bounding the space for holding the vacuum is made up of a ceramic material wall predominantly forming the vacuum vessel. The vessel according to the present invention can have joint components, for example, for connecting an evacuating system or components for providing accessories such as a vacuum gauge or a window, formed of a material other than ceramics, such as metals including stainless steel and aluminum alloy.

According to the present invention, ceramics include oxide based ceramics such as mullite and partially stabilized zirconia, and non-oxide ceramics such as silicon nitride ($Si_3N_4$) and silicon carbide (SiC). Although aluminum oxide could be considered for use as the ceramic of a vacuum vessel, aluminum oxide has relatively low strength and toughness in ordinary temperature, and a relatively high coefficient of thermal expansion of approximately $7\times10^{-6}$/

K. Therefore, aluminum oxide is not very suitable for manufacturing a large vacuum vessel for a particle accelerator that carries out baking while it is operated. From the standpoint of strength and coefficient of thermal expansion at ordinary and high temperatures, silicon nitride is most preferable for the formation of a vacuum vessel in the present invention.

The main portion of the surface bounding the space for holding a vacuum such as the wall, or the inner surface of the wall in particular, of the vacuum vessel consists of ceramics that have a strength significantly greater than that of glass at ordinary and high temperatures, and that have an amount of generation of gases such as hydrogen during pumping down or holding a vacuum, significantly lower than that of metals such as stainless steel and aluminum alloy. The main portion of the surface formed of ceramics can be baked at a temperature higher than that for a conventional vacuum vessel. Because ceramics have a high permeability of electric field and magnetic field, accelerated particles can be controlled with high precision when a vacuum vessel comprising ceramic according to the invention is used as a particle accelerator. An arbitrary electric field and/or magnetic field can be applied within the vessel. The vacuum vessel of the present invention is applicable for maintaining an ultrahigh vacuum ($10^{-8}$–$10^{-6}$ Pa) or an extremely high vacuum (at most $10^{-8}$ Pa, i.e. a pressure$\leqq 10^{-8}$ Pa).

A method of manufacturing a vacuum vessel is provided as follows. According to this method, a plurality of members consisting essentially of ceramic material and having bonding surfaces with a surface flatness of not more than 1 μm are prepared. Ceramic powder having an average particle diameter of not more than 1 μm is sandwiched between the bonding surfaces of the plurality of members and then subjected to a heating process for connecting the plurality of members. The surfaces between each of the plurality of members are strongly adhered to each other by the heating process.

The flatness of not more than 1 μm used here means that the degree of undulation and unevenness of the finished surface is within 1 μm over the entire bonding surface. For example, a bonding surface having a flatness of not more than 1 μm means that the bonding surface exists between two parallel planes not more than 1 μm apart from each other, according to Japanese Industrial Standard B 0021 (1984).

In manufacturing a ceramic material vacuum vessel, a method of bonding ceramic components having simple configurations formed by sintering is effective, because ceramics cannot be easily formed as a compact having a complex configuration and will have a high cost for machining work after sintering. Using glass having a coefficient of thermal expansion approximating that of the ceramic matrix to be bonded is known as one method of bonding ceramic components to each other. However, the bonding strength achieved by this method is low and is at most 100 MPa. Therefore, the bonded components are easily separated because of the thermal stress due to a slight difference in coefficients of thermal expansion between the glass and the matrix at the time of bonding or baking. The method disclosed here includes the steps of forming a plurality of ceramic components making up the wall of a vacuum vessel by a normal sintering method, interposing ceramic powder formed of ultrafine particles having an average particle diameter of not more than 1 μm, preferably not more than 0.5 μm between the surfaces of respective adjacent ones of the plurality of ceramic components, and applying a heating process to bond the components to each other. According to this method, the interlayer between the surfaces of bonded components can be reduced significantly in thickness because ultrafine particles are used. Because the formation of a bonding layer having a different coefficient of thermal expansion can be suppressed significantly, and because a strong bond can be obtained by reaction between the ceramic components and the particles, the bonded components will not be separated even if baking is repeatedly carried out during the usage of the vessel. Ceramic powder having an average particle diameter greater than 1 μm has a reduced reactivity, so that a sufficient bonding strength cannot be achieved. Furthermore, if a particle having a particle diameter greater than 1 μm is used, a gap will remain in the bonded joint, leading to the possibility of leakage.

Ceramic powder for forming the interlayer of the bonding joint may comprise a single substance or a mixed powder of a plurality of substances as long as it has a high reactivity and wettability with respect to the ceramic forming the vessel wall components and can form a bonding layer of high strength by reaction. For example, for a vessel component formed of $Si_3N_4$, powder constituted of only $Al_2O_3$ or a mixed powder is preferably used such as $Y_2O_3$—$Al_2O_3$—$SiO_2$ or $Si_3N_4$—$Y_2O_3$—$Al_2O_3$—$SiO_2$ which is a component similar to grain boundaries formed by sintering. More generally, the ceramic powder is formed essentially of at least one material selected from the group consisting of $Al_2O_3$, $Y_2O_3$, $SiO_2$, and $Si_3N_4$.

When the vessel component is formed of non-oxide ceramic, various sintering aids are added to the ceramic material for manufacturing the vessel component. In this case, it is necessary to select the composition of the ceramic powder taking into consideration the components of the sintering aids.

In bonding using ultrafine particles of ceramic powder as disclosed herein, a gap may remain in the bonding joint and cause leakage, if the surface of the component to be bonded is not sufficiently smooth, because the gap will not be easily filled by fusion as in the case of using glass for bonding. In order to achieve bonding with no leakage, it is necessary to set the average particle diameter of the ultrafine particles to not more than 1 μm as described above, as well as applying a high precision finishing process to the surface of the component to be bonded to have a flatness of not more than 1 μm, preferably not more than 0.5 μm. A typical machining method for finishing the surface with high precision is an abrasion process or the like using a high precision lapping machine.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

EMBODIMENT 1

Figure 1:
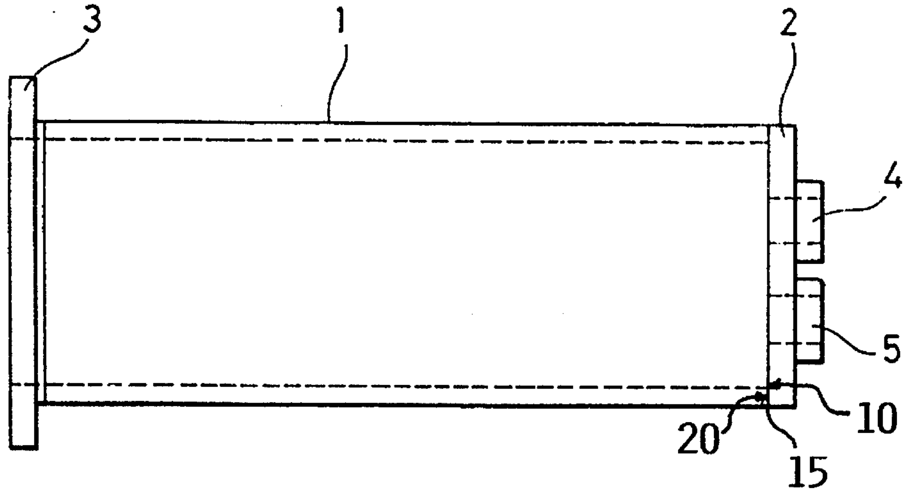
FIG. 1 is a side view of a ceramic material vacuum vessel according to an embodiment of the present invention.

Referring to FIG. 1, by sintering $Si_3N_4$ powder using $Y_2O_3$—$Al_2O_3$ as a sintering aid, an annular wall portion 1 of a right circular cylinder having a 200 mm outer diameter, 180 mm inner diameter and 600 mm length and having both ends open, a disk-shaped plate-wall portion 2 having a 200 mm diameter and 5 mm thickness and having two holes with a 40 mm diameter therein were formed. The bonding surface 10 of one end (annular end face having a width of 20 mm) of the annular wall portion 1 constituted of $Si_3N_4$ sintered body and the bonding surface 20 of the plate-wall portion 2 (the outer peripheral portion of the surface having a width of 20 mm) were processed to have a flatness of not more than 0.5 μm by a lapping process using diamond abrasive grains.

Then, $Al_2O_3$ ultrafine particle powder 15 having an average particle diameter of 0.07 μm was interposed between the bonding surfaces 10 and 20 of the annular wall portion 1 and the plate-wall portion 2, respectively, to then be subjected to a heating process for one hour at 1750° C. in a nitrogen atmosphere for preliminary bonding.

Then, an HIP (Hot Isostatic Pressing) process was applied for one hour at 1700° C. in a nitrogen gas environment of 1000 atmospheres pressure to completely bond the plate-wall portion 2 to one end of the annular wall portion 1. The obtained bonding strength was not less than 700 MPa according to another model test that was carried out to determine a value approximating that of the matrix. This value is drastically higher than the value of 50 MPa achieved in a specific conventional example where sealing glass is used.

Next, a stainless steel flange 3 having an inner diameter of 180 mm was bonded to the other end of the annular wall portion 1 having an annular end face, and stainless steel flanges 4 and 5 respectively having an inner diameter of 40 mm were bonded around the two holes of the plate-wall portion 2 so as to communicate respectively with the holes, thereby forming a ceramic material vacuum vessel. Each of flanges 3–5 was formed from clean stainless steel obtained by being dissolved under vacuum. The flanges each have a structure such that the exposed area of stainless steel in the interior of the vacuum vessel is as small as possible at the bonded portion. Furthermore, the surfaces of the flanges were oxidized to reduce the generation of hydrogen when under vacuum. The bonding of flanges 3, 4, and 5 with the annular wall portion 1 and the plate-wall portion 2 was carried out by interposing a layer including Ni for allowing plastic deformation so as to reduce thermal stress between the surfaces, followed by brazing using silver-copper brazing alloy containing titanium.

A titanium sublimation pump with two stages of molecular pumps functioning as auxiliary pumps of an evacuating system was connected to the flange 3 of the obtained vacuum vessel. The vessel of the titanium sublimation pump was made of clean stainless steel obtained by being dissolved under vacuum, and the inner wall thereof was mirror-finished by an electrolytic process, followed by an oxidation process. An extractor type vacuum gauge and a quadrupole mass spectrometer were connected to flanges 4 and 5, respectively, to complete a vacuum system.

The entire vacuum system was baked for ten hours at 300° C. After cooling, the titanium sublimation pump was actuated and the pressure and the composition of the remaining gas were measured. Also, a leakage test was carried out with a He leak detector. For the purpose of comparison, a vacuum system having a structure similar to the above-described vacuum system was provided using a vacuum vessel having a structure similar to that of the above-described vacuum vessel but made of clean stainless steel obtained by being dissolved under vacuum instead of being made of the $Si_3N_4$ sintered body. Then, similar tests were carried out. The results are shown in the following Table 1.

TABLE 1

| | Material of Wall of Vacuum Vessel | Achieved Pressure (Torr) | He Leakage Test | Mass Spectrometry (Relative Intensity) $H_2$ | $H_2O$ | $CO/N_2$ |
|---|---|---|---|---|---|---|
| Embodiment | $Si_3N_4$ Sintered Body | $3 \times 10^{-10}$ | 0 | 100 | 5 | 10 |
| Comparative Example | Stainless Steel | $8 \times 10^{-10}$ | 0 | 300 | 7 | 15 |

(Note) The zero in the column of He leakage test indicates that leakage was not detected.

It can be appreciated from the above Table 1 that the vacuum vessel having the wall formed of $Si_3N_4$ as a sintered body according to the present embodiment has a greatly reduced generation of hydrogen so as to obtain a lower achieved pressure in comparison with a conventional vacuum vessel having the wall formed of clean stainless steel. To examine the reliability of the vacuum vessel of the present embodiment, particularly the reliability of the bonded joints, the baking process was repeated ten times. However, no leakage was observed, and only a tendency of a slight decrease in achieved pressure was observed.

The reason why hydrogen accounts for the greatest proportion of the remaining gas, even in the vacuum vessel having its wall formed of $Si_3N_4$ as a sintered body, may be due to the existence of the stainless steel components remaining in the inner wall even though the area of steel exposed to vacuum is small. Also, the reason why an exact proportional relationship is not observed between the measured values of the achieved pressure and the quadrupole mass spectrometer readings may be that the linearity of the relationship is destroyed because of approximating the measurement limit of the vacuum gauge.

EMBODIMENT 2

Figure 2:
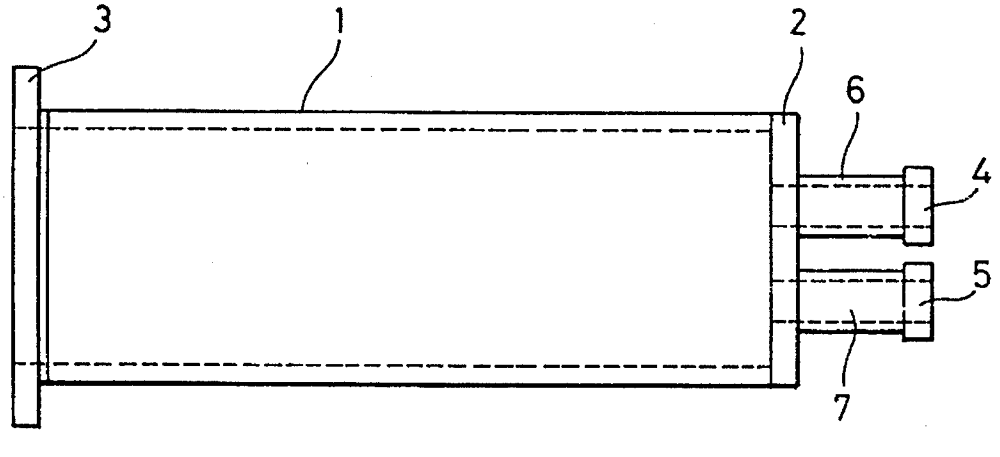
FIG. 2 is a side view of a ceramic material vacuum vessel according to another embodiment of the present invention.

Referring to FIG. 2, an annular wall portion 1 and a plate-wall portion 2 similar to those of the first embodiment were formed. Similarly, cylindrical portions 6 and 7 of a right circular cylinder were formed of $Si_3N_4$ as a sintered body having a 45 mm outer diameter, 40 mm inner diameter and 100 mm length and having both ends open. As in the first embodiment, the annular wall portion 1 and the plate-wall portion 2 were bonded. Then, simultaneously, the area surrounding each of the two holes in the plate-wall portion 2 and the respective mating end surfaces of cylinders 6 and 7 were finished to have a surface flatness of 0.3 μm respectively. They were bonded together as in the first embodiment using an $Al_2O_3$ ultrafine particle powder having an average particle diameter of 0.07 μm.

A stainless steel flange 3 identical to that in the first embodiment was bonded to the other end of the annular wall portion 1, and stainless steel flanges 4 and 5 identical to those in the first embodiment were bonded to the open-end end surfaces of cylinders 6 and 7, respectively, by interposing Ni therebetween, respectively, and by using silver-copper brazing alloy containing titanium as in the first embodiment, in order to form a vacuum vessel. Furthermore, as in the first embodiment, a titanium sublimation pump, an extractor type vacuum gauge, and a quadrupole mass spectrometer were connected to flanges 3, 4 and 5, respectively to complete a vacuum system.

Cylinders 6 and 7 and flanges 4 and 5 were cooled at 300° C. for protecting the vacuum gauge and the mass spectrometer, while the vacuum vessel was baked for ten hours at 600° C. Then, the entire vacuum system was cooled after the baking process, and tests similar to those of the first embodiment were carried out. The results are shown in Table 2.

TABLE 2

| Material of Wall of Vacuum Vessel | Achieved Pressure (Torr) | He Leakage Test | Mass Spectrometry (Relative Intensity) $H_2$ | $H_2O$ | $CO/N_2$ |
|---|---|---|---|---|---|
| $Si_3N_4$ Sintered Body | $5 \times 10^{-11}$ | 0 | 30 | 2 | 7 |

(Note) The zero in the column of He leakage test indicates that leakage was not detected.

It can be appreciated from the results shown in Table 2 from the second embodiment that the achieved pressure and the relative intensity of the mass spectrometer readings are reduced significantly as a result of baking at a high temperature in comparison with the first embodiment.

According to the present invention, a high vacuum vessel can be provided that has sufficient mechanical strength at ordinary and high temperatures, that has a greatly reduced amount of generation of gas such as hydrogen, which would cause a rise in the achieved pressure of the vacuum, and that has high reliability with respect to a repetitive baking process for preventing gas generation. The vacuum vessel has an achieved pressure lower than that of a vacuum vessel formed of stainless steel or aluminum alloy, and can attain and maintain an extremely high vacuum using a high performance evacuating system to be applicable to fields such as semiconductor manufacturing.

The vacuum vessel has a high permeability of electric field and magnetic field in addition to a low achieved pressure. Therefore, the vacuum vessel is also applicable as a vacuum vessel that allows the accurate control of charged particles by an externally provided coil in the field of particle accelerators.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a vacuum vessel for maintaining a vacuum in an interior space thereof, comprising the following steps:

preparing a plurality of wall members formed essentially of ceramic material;

preparing on each said wall member at least one bonding face having a surface flatness of not more than 1 μm;

positioning respective mating ones of said bonding faces adjacent one another;

interposing a ceramic powder as a bonding substance between said mating bonding faces, wherein said ceramic powder has an average particle diameter of not more than 1 μm; and carrying out a heating process to bond together said wall members through said bonding substance to form a wall of said vacuum vessel around said interior space.

2. The method of claim 1, wherein said ceramic material essentially consists of silicon nitride.

3. The method of claim 1, wherein said ceramic powder is formed essentially of at least one material selected from the group consisting of $Al_2O_3$, $Y_2O_3$, $SiO_2$, and $Si_3N_4$.

4. The method of claim 1, wherein said surface flatness of said bonding face is not more than 0.5 μm, and said average particle diameter of said ceramic powder is not more than 0.5 μm.

5. The method of claim 1, wherein said surface flatness of said bonding face is about 0.3 μm, and said average particle diameter of said ceramic powder is about 0.07 μm.

6. The method of claim 1, wherein said ceramic powder consists essentially of $Al_2O_3$.

7. The method of claim 6, wherein said ceramic material excludes $Al_2O_3$.

8. The method of claim 7, wherein said ceramic material comprises silicon nitride.

9. The method of claim 1, wherein said ceramic material excludes $Al_2O_3$.

10. The method of claim 1, wherein said ceramic material comprises silicon nitride.

11. The method of claim 1, wherein said surface flatness of said bonding face is defined as the measure of any unevenness of said bonding face varying from a perfect plane over the entirety of said bonding face.

12. The method of claim 1, wherein said heating process comprises a preliminary bonding heat treatment step and a final bonding hot isostatic pressing step.

13. The method of claim 12, wherein said heat treatment step comprises heating said bonding substance at about 1750° C. for about 1 hour in a nitrogen atmosphere, and said hot isostatic pressing step comprises heating and pressurizing said bonding substance at about 1700° C. for about 1 hour in a nitrogen atmosphere at a pressure of about 1000 atm.

14. The method of claim 12, wherein said ceramic powder is selected and said heating process is carried out to achieve a bond strength of at least 700 MPa between said wall members that have been bonded together.

15. The method of claim 1, wherein said ceramic powder is selected and said heating process is carried out to achieve a bond strength of at least 700 MPa between said wall members that have been bonded together.

16. The method of claim 1, wherein said bonding achieved by said heating process comprises fusion and reaction between said ceramic powder and said mating bonding faces.

17. The method of claim 1, further comprising preparing a vessel component of metal, and bonding said metal vessel component to at least a selected one of said wall members by brazing.

18. The method of claim 17, wherein said brazing comprises interposing a layer containing Ni between said selected wall member and said metal vessel component and then brazing said selected wall member to said metal vessel component through said layer containing Ni using a brazing alloy containing silver, copper and titanium.

19. The method of claim 17, wherein said metal is clean stainless steel.

20. The method of claim 1, wherein said step of interposing said ceramic powder between said mating bonding faces consists essentially of interposing only a ceramic powder by itself between said mating bonding faces.

* * * * *